B. A. GRANT.
Grain-Separator.
No. 199,151. Patented Jan. 15, 1878.
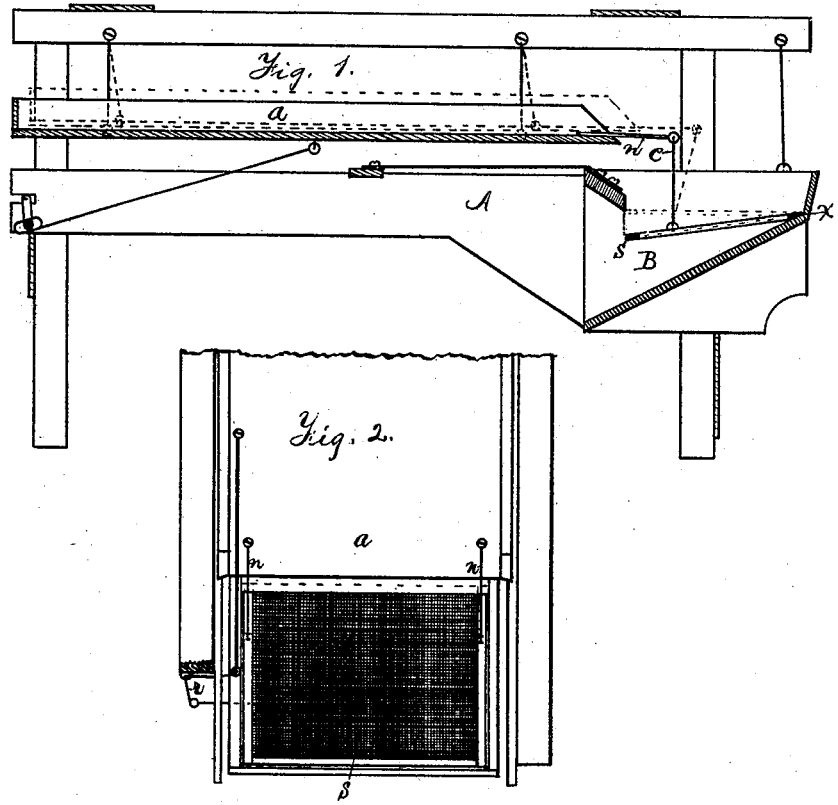
Witnesses
Thos. H. Hutchins
Wm. J. Hutchins
Inventor
Belville A. Grant

UNITED STATES PATENT OFFICE.

BELVILLE A. GRANT, OF JOLIET, ILLINOIS.

IMPROVEMENT IN GRAIN-SEPARATORS.

Specification forming part of Letters Patent No. 199,151, dated January 15, 1878; application filed September 4, 1877.

*To all whom it may concern:*

Be it known that I, BELVILLE A. GRANT, of the city of Joliet, in Will county, and State of Illinois, have invented certain Improvements in Grain-Sieves and the mode of operating them, the description and operation of which I will proceed to explain, reference being had to the annexed drawings, in which—

Figure 1 is vertical sectional view through the center, and Fig. 2 a plan view on the top, of the sieve.

The nature and object of the invention are to so operate the grain-sieves of a thrashing-machine separator or fanning-mill, that the sieves will not clog with heads and chaff, &c., while in operation.

In the drawings, B represents the sieve-shoe at the rear end of the machine, such as is ordinarily used, which contains the sieve S, the outer end resting in the shoe B at $x$, and the end next the fan suspended by means of the chain or rod $c$, which is attached to a hook of the arm $n$ attached to the swinging or movable carrier $a$. This arrangement is for the purpose of giving the end of the sieve S next the fan a tossing upward motion, so as toss up and down the grain and chaff that may lie on it, so it will not clog in the meshes of the sieve.

It will be observed that as the carrier $a$ swings to and fro in the manner shown by the dotted lines, it will jerk the inner end of the sieve S up and down while the sieve takes any other motion that may be given the shoe B at the same time, whether it be an end or side shake. In a side shake of the shoe B the inner end of the sieve S would receive but very little motion were it not for this secondary motion already described, and that is probably the greatest cause of its clogging, which is very thoroughly prevented by this arrangement.

This tossing motion has heretofore been given to the whole surface of the sieve without causing the inner end to describe the arc of a circle, as in this case, but that arrangement was not satisfactory, as it did not impel the chaff forward as this arrangement does. The inner end getting a high toss, while the outer end gets comparatively none, has a great tendency to carry the chaff forward, and discharge the chaff more readily.

The mechanical arrangement by means of which this tossing motion is imparted to the inner end of the sieve is not deemed of so much importance, only so that motion is preserved.

Having thus described my invention, what I claim as new, and desire to secure by Letters Patent, is as follows:

1. The sieve S, having a tossing motion of its end next the fan imparted to it by means of the rod or chain $c$, hook $n$, and swinging carrier $a$, when arranged and operating substantially as set forth.

2. The combination of the swinging carrier $a$, having the rod or hook $n$, and link or chain $c$, with the laterally-shaking shoe B, and sieve S, having its inner end free to rise and fall, as and for the purpose set forth.

BELVILLE A. GRANT.

Witnesses:
THOS. H. HUTCHINS,
WM. J. HUTCHINS.